A. J. EDGETT.
Grain-Drill.
No. 58,166. Patented Sept. 18, 1866.
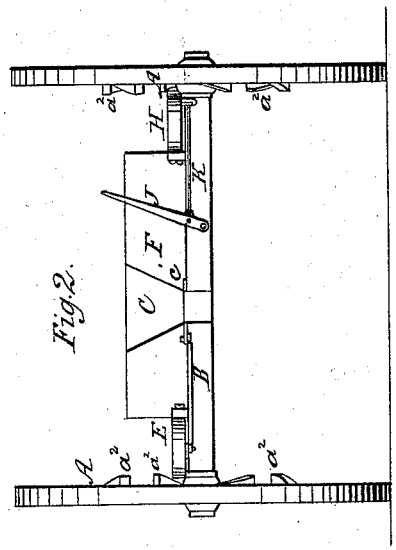
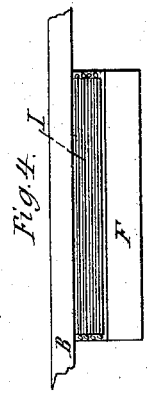
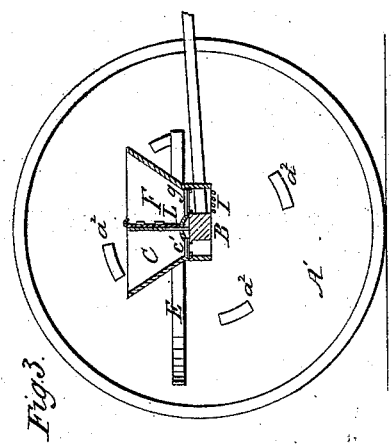
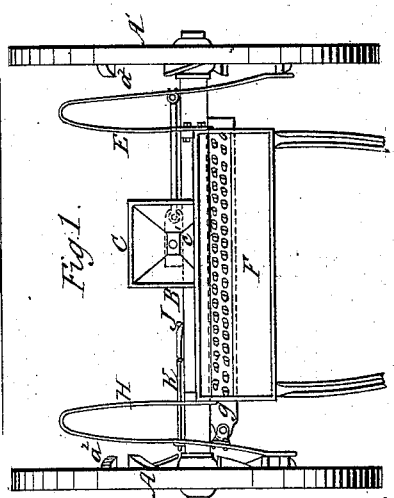
Witnesses.
B. H. Muehle
Franklin Ransom
Inventor:
By A. J. Edgett.
E. B. & W. H. Forbush attys.

UNITED STATES PATENT OFFICE.

ANDREW J. EDGETT, OF HORNELLSVILLE, NEW YORK, ASSIGNOR TO HIMSELF, JOHN W. FERRY, AND A. GRAVES, OF SAME PLACE.

IMPROVEMENT IN COMBINED CORN-PLANTER AND BROADCAST SEEDER.

Specification forming part of Letters Patent No. 58,166, dated September 18, 1866.

*To all whom it may concern:*

Be it known that I, ANDREW J. EDGETT, of Hornellsville, Steuben county, and State of New York, (assignor to myself, JOHN W. FERRY, and ALONZO GRAVES,) have invented a new and Improved Combined Broadcast Grain-Sower and Seed-Planter; and I do hereby declare that the following is a full, clear, and exact description thereof, reference being had to the accompanying drawings, making a part of this specification, in which—

Figure I is a top-plan view. Fig. II is a rear-end elevation. Fig. III is a transverse section through the corn-planting and seed-sowing boxes, to show more clearly their relative positions. Fig. IV is a bottom plan of the broadcast seed-sowing box, to show the distributing-wires thereon.

The nature of this invention relates, first, to the combination of a corn-planter with a broadcast seed-sower in one machine, so that the machine may be used for either purpose, as may be desired; second, distributing-wires placed on the bottom of the grain-box of a broadcast seed-sower, in combination with the slides, for the purpose of effecting a more even and perfect distribution of the grain.

Letters of like name and kind refer to like parts in each of the figures.

A and A' represent the carrying and driving wheels, with lugs or cams $a^2$ thereon for operating the slides. B is the axle. C represents the planting-box, which has a vibrating slide, $c'$, in the bottom thereof, with the proper apertures therein for dropping the kernels of corn. This slide is connected with the spring E, and the spring E is so arranged that the lugs of the wheel A' will come in contact therewith and move the spring and slide in the direction to open the apertures and drop the requisite number of kernels for a hill, and as the cam moves off from the spring the spring will react and move the slide in a manner to close the apertures. All this is done in a common manner.

F represents the grain-box for broadcast seed-sowing. This has apertures and slide $g$, of common construction. The slide is connected with the spring H. The lugs or cams on the wheel come in contact with the spring and move it and the slide in the direction to open the apertures and allow the grain to pass through, and as the cams move off from the spring the spring reacts in a manner to close the apertures. This slide is made to operate much faster than the planting-slide by reason of the greater number of cams on the wheel A, and there is a double set of holes through the slide, in order to admit a sufficient quantity of grain for broadcast sowing. There is placed on the bottom of the grain-box and below the slide a number of distributing-wires, I, for the purpose of insuring a more even and uniform distribution of the grain.

It will be noticed that the grain will pass through the apertures in the slide in streams, and without the distributing-wires would be sowed in rows: but with these wires added at the bottom of the grain-box and below the slide the grain will drop onto these wires and must fall between them, and hence will be likely to drop evenly and uniformly upon the ground, no thicker in one spot than in another, and hence a perfect broadcast sowing is effected. These wires may be placed crosswise of the box; but I prefer to place them longitudinally, as shown.

At J is represented a lever, and at K a connecting-rod, which connects the lever with the spring. This is for the purpose of moving and holding the spring back from the reach of the cams on the wheel whenever, in backing or otherwise, it is desirable to move the machine without operating the slide. There is a similar arrangement of a lever with the corn-planter, so that only one machine will be operated at the same time. A communication is made between the corn-planter box and the grain-box of the broadcast sower, in order that both boxes may be used for carrying grain when either machine is used, as shown at L. For instance, if the machine is used for planting corn, then the grain-box may be filled with corn and drawn from that into the corn-box, as may be needed; and when the machine is used for broadcast sowing then the corn-box may be filled with grain and drawn into the grain-box as may be needed. Hence a greater quantity of grain may be carried on the combined machine for either purpose than could be carried on a single machine.

When the corn-planter is used then the spring of the seed-sower is set back out of reach of the cams of the wheel A by means of the lever and connecting-rod, as aforesaid, so that the slide in the grain-box will not operate; and the same is the case with reference to the corn-planter when the broadcast seed-sower is used, and hence it will be seen that there is an advantage in combining these two machines in one.

What I claim as my invention, and desire to secure by Letters Patent, is—

1. The construction and combination of a corn-planter with a broadcast seed-sower, so that either machine can be used, substantially as described.

2. The distributing-wires I, in combination and arrangement with the grain-box and slide of a broadcast seed-sower, for the purpose and substantially as set forth.

ANDREW J. EDGETT.

Witnesses:
THOMAS DICKINSON,
B. H. MUEHLE.